(12) United States Patent
Zhou et al.

(10) Patent No.: US 12,257,615 B2
(45) Date of Patent: Mar. 25, 2025

(54) STACKED CIRCULATABLE MICROBIAL ELECTROCHEMICAL REACTOR AND DEGRADATION METHOD OF PETROLEUM HYDROCARBON CONTAMINATED SOIL

(71) Applicant: Nankai University, Tianjin (CN)

(72) Inventors: Qixing Zhou, Jinnan District (CN); Tian Li, Jinnan District (CN); Xin Wang, Jinnan District (CN)

(73) Assignee: Nankai University, Tianjin (CN)

( * ) Notice: Subject to any disclaimer, the term of this patent is extended or adjusted under 35 U.S.C. 154(b) by 1014 days.

(21) Appl. No.: 17/225,974

(22) Filed: Apr. 8, 2021

(65) Prior Publication Data
US 2022/0219212 A1 Jul. 14, 2022

(30) Foreign Application Priority Data

Jan. 8, 2021 (CN) .......................... 202110023805.8

(51) Int. Cl.
*B09C 1/08* (2006.01)
*B09C 1/10* (2006.01)
(52) U.S. Cl.
CPC ................ *B09C 1/085* (2013.01); *B09C 1/10* (2013.01); *B09C 2101/00* (2013.01)

(58) Field of Classification Search
CPC ........ B09C 1/085; B09C 1/10; B09C 2101/00
See application file for complete search history.

(56) References Cited

PUBLICATIONS

English Translation of JP-2013084597-A (Year: 2013).*

* cited by examiner

*Primary Examiner* — Salil Jain
(74) *Attorney, Agent, or Firm* — Patterson + Sheridan, LLP (57) ABSTRACT

A stacked circulatable microbial electrochemical reactor and a degradation method of petroleum hydrocarbon contaminated soil are provided, which belong to the field of microbial electrochemical soil remediation. The stacked circulatable microbial electrochemical reactor of the present disclosure expands influence range of anodes by a stacked microbial electrochemical system, accelerates the movement of the petroleum hydrocarbon molecules in the contaminated soil by a water circulation system, and improves the mass transfer capacity of soil, thereby increasing the degradation efficiency of petroleum hydrocarbon in the contaminated soil with microbial electrochemical technology from different aspects. The degradation method of petroleum hydrocarbon contaminated soil is provided. The degradation method of the present disclosure is simple in operation and has a high degradation efficiency of petroleum hydrocarbon in contaminated soil.

9 Claims, 5 Drawing Sheets

STACKED CIRCULATABLE MICROBIAL ELECTROCHEMICAL REACTOR AND DEGRADATION METHOD OF PETROLEUM HYDROCARBON CONTAMINATED SOIL

CROSS REFERENCE TO RELATED APPLICATION

This application claims the benefit and priority of Chinese Patent Application No. 202110023805.8, entitled "Stacked Circulatable Microbial Electrochemical Reactor and Degradation Method of Petroleum Hydrocarbon Contaminated Soil" filed with the Chinese Patent Office on Jan. 8, 2021, which is incorporated herein by reference in its entirety.

TECHNICAL FIELD

The present disclosure relates to the field of microbial electrochemical soil remediation technology, and in particular, to a stacked circulatable microbial electrochemical reactor and a degradation method of petroleum hydrocarbon contaminated soil.

BACKGROUND ART

The exploitation and utilization of oilfield greatly improve the economic level of the country, but also cause serious petroleum contamination problem during exploitation and transportation. There are higher requirements for the efficient and environmentally friendly soil remediation of petroleum contaminated soil in Law of the People's Republic of China on Soil Pollution Prevention and Control promulgated in 2018. With increasing knowledge of the ecological toxic effect and health risks caused by petroleum contamination in various countries of the world, the remediation of petroleum contamination soil has become a research hotspot which has attracted worldwide attention.

The development of the Microbial Electrochemical Technology (MET) at the end of the last century, provided new means and methods for supplementing electron acceptor to the soil surroundings. In MET, the electroactive microorganisms at the anode can oxidize the organic contaminant in the surrounding environment to generate electrons, which are transferred to the cathode via an external circuit where reduction reaction occurs to generate an electrical signal. Such a structure is adjustable in terms of wire length and location and makes it possible to provide electron acceptor for anaerobic metabolism. MET is adopted by Morris J M, Jin S et al. to implement conversion from macromolecule of C8-C25 petroleum hydrocarbon in the subterranean water to micromolecule, (seeing "Feasibility of using microbial fuel cell technology for bioremediation of hydrocarbon in groundwater", by Morris J M, Jin S et al., Journal of Environmental Science and Health Part A, 2008, 43: 18-23), thereby improving efficiency of soil remediation by 51%. Thereafter, both tubular MET designed by Yuan et al. (seeing "A new approach to situ sediment remediation based on air-cathode microbial fuel cells", by Yuan Y, Zhou S, Zhuang L, Journal of Soils and Sediments, 2010, 10: 1427-1433) and addition of ferrous hydroxide into MET by Yan et al. (seeing "Enhanced degradation of phenanthrene and pyrene in freshwater sediment by combined employment of sediment microbial fuel cell and amorphous ferric hydroxide", by Yan Z, Song, N, Cai H, et al., Journal of Hazardous Materials, 2012, 199-200: 217-225) improve the situation of lacking electron acceptors in sediment, and the latter enables efficient removal of phenanthrene and pyrene. These provide a research basis for efficient degradation of petroleum hydrocarbon in the soil environment, and also demonstrate that once electron acceptors are sufficient, the petroleum hydrocarbon can be oxidized into micromolecule organics by anaerobic microorganisms.

Based on the above described results, MET is embedded into petroleum hydrocarbon contaminated soil by Wang et al. (seeing "Biochemical stimulation of petroleum hydrocarbon degradation in saline soil using U-tube microbial fuel cell", by Wang X, Cai Z, Zhou Q, et al., Biotechnology and Bioengineering, 2012, 109: 426-433), and thus the degradation efficiency of petroleum hydrocarbon is improved by 120%, and it is found that macromolecular alkanes and macromolecular aromatic hydrocarbon are degraded greatly. Subsequently, the soil microbial electrochemical technology (S-MET) is rapidly developed, and the degradation efficiency of petroleum hydrocarbon by the anaerobic microorganisms is further improved by optimizing the reactor configuration, regulating the microbial community, improving the soil environment and so on. The above technologies provide substantial research bases for the anaerobic microorganisms efficiently metabolizing petroleum hydrocarbon. It is found that the enrichment of electroactive microorganisms can induce the production of a large amount of bacteria for degrading petroleum hydrocarbon. However, the electroactive microorganisms in the S-MET only affect the enrichment of petroleum hydrocarbon degrading bacteria within a distance of 1 cm from the anode surface at present, which greatly limits the application of the S-MET.

SUMMARY

In view of the above, it is an object of some embodiments to provide a stacked circulatable microbial electrochemical reactor and a degradation method of petroleum hydrocarbon contaminated soil. The stacked circulatable microbial electrochemical reactor provided according to the present disclosure has excellent degradation efficiency of petroleum hydrocarbon contaminated soil, and expands application range of the electrochemical reactor.

In order to achieve the above object of the embodiments, the following technical solution is provided according to the present disclosure.

It is provided a stacked circulatable microbial electrochemical reactor according to the present disclosure. The stacked circulatable microbial electrochemical reactor provided by the present disclosure uses microbial electrochemical principle to efficiently enrich electroactive microorganisms and microorganisms for degrading petroleum hydrocarbon. Efficient remediation of petroleum hydrocarbon contaminated site is achieved by stacking multi-layer electrodes to strengthen the remediation process, with aid of micro water flow for driving petroleum hydrocarbon molecules to the vicinity of the electrodes. The stacked circulatable microbial electrochemical reactor of the present disclosure expands influence range of the anodes, accelerates the movement of the petroleum hydrocarbon molecules in the contaminated soil by the water circulation system, and improves the mass transfer capacity of soil, thereby increasing the degradation efficiency of petroleum hydrocarbon in the contaminated soil with microbial electrochemical technology from different aspects.

It is further provided a degradation method of petroleum hydrocarbon contaminated soil according to the present disclosure using the stacked circulatable microbial electrochemical reactor described in the above technical solution. In the degradation method of the present disclosure, microorganisms in a stacked circulatable microbial electrochemical reactor are firstly enriched. Then, degradation is performed on petroleum hydrocarbon contaminated soil by the enriched microorganisms. The degradation method of the present disclosure is simple in operation and has a high degradation efficiency of petroleum hydrocarbon in contaminated soil.

List of reference numerals: A reactor body, B water circulation system, A-1 electrode couple, 1 reactor housing, 2 working electrode, 2-1 mixture of biochar particles and soil particles, 2-2 outside wrapping steel mesh, 3 counter electrode, 4 wire, 5 water storing and regulating tank, 6 external water pipe, 7 water outlet switch, 8 speed-regulating water circulating pump, 9 water circulating pipe, 10 DC power supply, 11 water outlet.

DETAILED DESCRIPTION OF THE EMBODIMENTS

Figure 1:
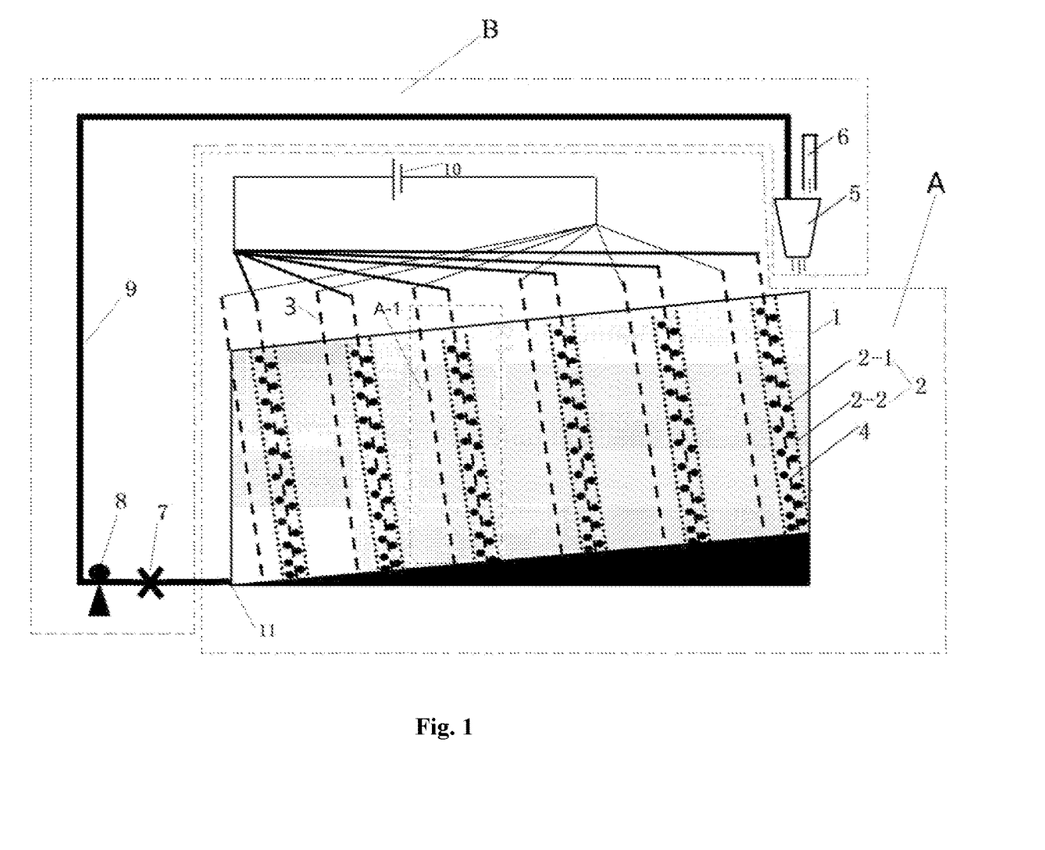
FIG. 1 is a schematic structural diagram of a stacked circulatable microbial electrochemical reactor provided by the present disclosure.

FIG. 1 is a schematic structural diagram of a stacked circulatable microbial electrochemical reactor provided by the present disclosure. The stacked circulatable microbial electrochemical reactor provided by the present disclosure is described in detail below with reference to FIG. 1.

It is provided a stacked circulatable microbial electrochemical reactor according to the present disclosure, which comprises a reactor body A and a water circulation system B located outside the reactor body.

The stacked circulatable microbial electrochemical reactor provided by the present disclosure includes a reactor body A. The reactor body A includes a reactor housing 1, whose inner bottom is in a slope shape. A slope of the inner bottom of the reactor housing 1 is about 30 degrees. In the present disclosure, the reactor housing 1 is made of acrylic material. In an embodiment of the present disclosure, the reactor housing 1 has a length of about 2 m and a width of about 0.4 m. A side of the reactor housing has a height of about 0.9 m and an opposite side has a height of about 1.0 m.

In the present disclosure, the reactor body A includes an electrode group inserting soil located inside the reactor housing 1, and the electrode group is laid perpendicularly to and along the inner bottom. In the present disclosure, the electrode group includes multiple electrode couples A-1 placed in parallel to each other, such electrode couples are inserted into the soil. A distance between adjacent electrode couples is about 15 cm to about 25 cm, and, in one example, about 20 cm. The electrode couples A-1 each include a working electrode 2 and a counter electrode 3 arranged in parallel to each other. The number of the electrode couples A-1 is not specifically limited in the present disclosure, and may be determined depending on the distance between the adjacent electrode couples and size of the reactor housing.

In the present disclosure, the working electrode 2 includes two sheets of outside wrapping steel mesh 2-2 arranged in parallel to each other and a mixture 2-1 of biochar particles and soil particles filled between the two sheets of outside wrapping steel mesh 2-2. A distance between the two outside wrapping steel mesh 2-2 is about 4 cm to about 6 cm, and, in one example, about 5 cm, the soil particles are particles of farmland soil. In the present disclosure, the biochar particles and soil particles in the mixture of biochar particles and soil particles have mass ratio of 1:1 to 1:5, and, in one example, 1:5. In the present disclosure, the farmland soil particles are subjected to pretreatment so as to be the soil particles. The pretreatment includes removing impurities and crushing. The parameter for crushing process is not specifically limited in the present disclosure, as long as the soil particles can be surrounded by the outside wrapping steel mesh. The particle size of the biochar particles is not specifically limited in the present disclosure, as long as the biochar particles can be surrounded by the outside wrapping steel mesh. In the present disclosure, the distance between the two outside wrapping steel mesh 2-2 is about 4 cm to about 6 cm, and, in one example, about 5 cm. The two sheets of outside wrapping steel mesh 2-2 and the conductive steel mesh each has an aperture of about 10 to about 20 meshes, and, in one example, about 20 meshes. In the present disclosure, the biochar particles and the soil particles are fixed by the two sheets of outside wrapping steel mesh, and are configured as the working electrode. In the present disclosure, a wire 4 is embedded into mixture of biochar particles and soil particles between the two sheets of outside wrapping steel mesh, so as to achieve connection with a DC power supply 10.

In the present disclosure, the soil particles in the working electrode include microorganisms and organic matters. The microorganisms are mainly electricigens and geobacteraceae sulferreducens. After water is introduced into the stacked circulatable microbial electrochemical reactor and an external voltage is applied thereto, the electricigens in the soil particles start to grow and gather by utilizing the organic matters, for subsequent degradation of contaminant. Since the microorganisms are electricigens, an electrical signal is generated by the system, and is in turn used for monitoring the degradation process.

In the present disclosure, the counter electrode 3 is a conductive steel mesh. The conductive steel mesh has an aperture of 10 to about 20 meshes, and, in one example, 20 meshes.

In the present disclosure, in each electrode couple, a distance between the counter electrode 3 and one outside wrapping steel mesh 2-2 in the working electrode 2 adjacent to the counter electrode 3 is about 4 cm to about 6 cm, and, in one example, about 5 cm.

In an embodiment of the present disclosure, the size of the two sheets of outside wrapping steel mesh of the working electrode and the size of the conductive steel mesh of the counter electrode are about 0.9 m in length and about 0.4 m in width, when the reactor housing has the length of about 2.0 m and width of about 0.4 m and the height of about 0.9 m.

In the present disclosure, the reactor body A includes the DC power supply 10 connected with the electrode group inserting soil via the wire 4.

In the present disclosure, the stacked circulatable microbial electrochemical reactor includes the water circulation system B located outside the reactor body A.

In the present disclosure, the water circulation system B includes: a water storing and regulating tank 5, located at a top of one side of the reactor housing 1, water in the water storing and regulating tank 5 being injected into the reactor housing 1; a water outlet 11, located at a bottom of another side of the reactor housing, the one side of the reactor housing 1 provided with the water storing and regulating tank 5 being opposite to the another side of the reactor housing 1 provided with the water outlet 11, that is, the water outlet of the reactor housing and the water storing and regulating tank being arranged diagonally, the one side of the reactor housing 1 provided with the water storing and regulating tank 5 being parallel to the electrode couples A-1. The positions of the water outlet and the water storing and regulating tank present the diagonal relationship in present disclosure, so that the water in the system can pass through all the electrode couples and the soil, thereby achieving sufficient flow of microorganisms with the water flow and improving the degradation efficiency. In the present disclosure, the water outlet 11 is in communication with the water storing and regulating tank 5 via a water circulating pipe 9 located outside the reactor housing 1. In the present disclosure, the water circulating pipe 9 is provided thereon with a water outlet switch 7 and a speed-regulating water circulating pump 8. In the present disclosure, the water circulation system B further includes an external water pipe 6 in communication with the water inlet of the water storing and regulating tank 5. The external water pipe 6 supplies water to the water storing and regulating tank 5. In the present disclosure, the water storing and regulating tank 5 is a polytetrafluoro cone frustum having an upper bottom surface of a diameter of about 20 cm and a lower bottom surface of a diameter of about 10 cm and a height of about 15 cm.

It is further provided a degradation method of petroleum hydrocarbon contaminated soil according to the present disclosure, which employs the stacked circulatable microbial electrochemical reactor described in the above technical solution, and comprises:

(i) filling the petroleum hydrocarbon contaminated soil to be degraded between the working electrode 2 and the counter electrode 3 of the stacked circulatable microbial electrochemical reactor;

(ii) closing the water outlet switch 7, wetting the petroleum hydrocarbon contaminated soil in the stacked circulatable microbial electrochemical reactor with water in the water storing and regulating tank 5, and switching on the DC power supply 10 to provide a voltage between the working electrode 2 and the counter electrode 3 after the petroleum hydrocarbon contamination soil is completely wetted; and (iii) opening water outlet switch 7 upon an electrical signal reaching a maximum current, activating the s speed-regulating water circulating pump 8, such that water circulates in the water circulating pipe 9 and the reactor housing 1 for performing degradation.

In the present disclosure, the petroleum hydrocarbon contaminated soil to be degraded is pretreated before filled. The pretreatment includes air drying, removing impurities such as stone blocks and dendrites, and then crushing. The manner of crushing is not particularly limited in the present disclosure, as long as most crushed particles may pass through an about 2 mm sieve.

In the present disclosure, the voltage is about 0.7 V to about 0.8 V.

In the present disclosure, the stacked circulatable microbial electrochemical reactor is wet, and an external voltage is applied, so that electricigens in the soil particles starts to grow and enrich by utilizing the organic matters in the soil particles. When the electrical signal reaches a maximum current, the enrichment of microorganisms is complete, i.e., the amount of microorganisms is maximum. Subsequent degradation is then carried out, improving degradation rate of the petroleum hydrocarbon.

In the present disclosure, the flow rate of the circulation water in the water circulating pipe is about 1 mL/min to about 10 mL/min, and, in one example, about 10 mL/min, during the degradation.

In the present disclosure, remediation effect of the soil is determined mainly by combining the electrical signal feedback and the fluorescence intensity of the circulation water. When the electrical signal fed back drops to a certain value, it is possible that the drop of the electrical signal caused by an increase in the biomass of the non-electrogenesis microorganisms interferes with the remediation effect for the petroleum hydrocarbon in the soil. The remediation effect of soil needs to be therefore determined by combining the fluorescence intensity of petroleum hydrocarbon in the circulation water.

In the present disclosure, when the fluorescence intensity of the circulation water is measured, an excitation wavelength is about 435 nm to about 480 nm, and, in one example, about 480 nm. An emission wavelength is about 660 nm to about 700 nm, and, in one example, about 700 nm.

In the present disclosure, in order to accurately determine the concentration of petroleum hydrocarbon in the circulation water, it is preferable to acquire a linear relationship between the gradient concentration standard and the fluorescence intensity, and then extract water sample from the water circulating pipe and measure the fluorescence intensity of the water sample to determine a corresponding concentration, and determine the remediation effect. The method for acquiring the linear relationship between the gradient concentration standard and the fluorescence intensity is not specifically limited in the present disclosure, and may be technical means well known to those skilled in the art.

The degradation method of the present disclosure firstly enriches microorganisms in the stacked circulatable microbial electrochemical reactor, and then degrades petroleum hydrocarbon contaminated soil by using the enriched microorganisms. The degradation method of the present disclosure is simple to operate and has high degradation efficiency for petroleum hydrocarbon in contaminated soil.

Figure 2:
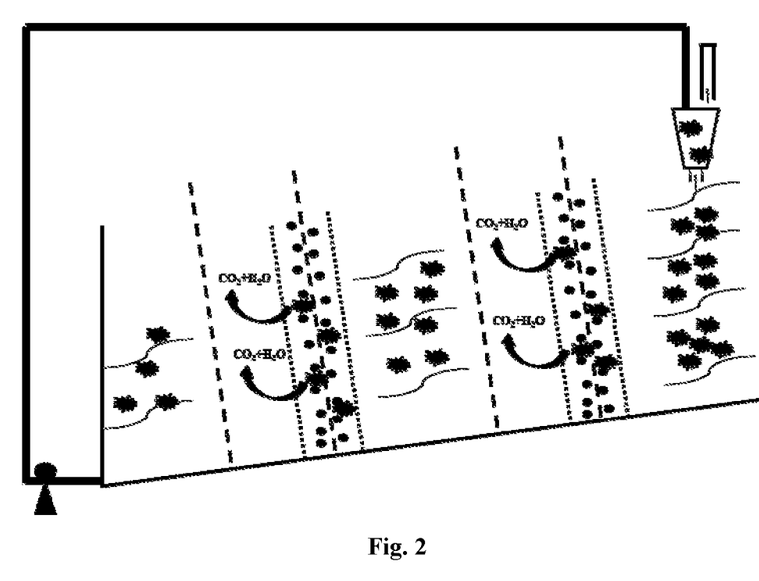
FIG. 2 is a schematic diagram of contaminant degradation in a stacked circulatable microbial electrochemical reactor provided by the present disclosure.

FIG. 2 is a schematic diagram of contaminant degradation in a stacked circulatable microbial electrochemical reactor provided according to the present disclosure. It can be seen from FIG. 2 that each electrode couple can degrade petroleum hydrocarbon molecules, and residual petroleum hydrocarbon molecules reenter into a remediation system by circulation water flow, thereby improving the remediation effect.

The stacked circulatable microbial electrochemical reactor and a degradation method of petroleum hydrocarbon contaminated soil provided by the present disclosure will be described in detail below in combination with embodiments which are not to be construed as limiting to the scope of protection of the present disclosure.

Embodiment 1

1) Assembling the Stacked Circulatable Microbial Electrochemical Reactor

The petroleum hydrocarbon contaminated soil is pretreated and then placed in the reactor housing made of acrylic material having a length of about 2 m, a width of about 0.4 m, a height of about 0.9 m on a left side, and a height of about 1 m on a right side. The bottom of the reactor has a slope of about 30 degrees. The reactor housing is provided at the bottom left side of the reactor housing, with a water outlet which has a diameter of about 1 cm and is provided with a filter screen for filtering mud sand. The reactor housing is provided with the water storing and regulating tank constituted by polytetrafluoro cone frustum, which has an upper bottom surface of a diameter of about 20 cm and a lower bottom surface of a diameter of about 10 cm and a height of about 15 cm, and is connected with the external water pipe and the water circulating pipe. After the petroleum hydrocarbon contaminated soil is placed, the conductive steel meshes with 20 meshes and having a length of about 90 cm and a width of about 40 cm are inserted into the soil in turn, and the working electrodes at a distance of about 5 cm from the respective conductive steel meshes are inserted into the soil. The working electrodes each include two conductive outside wrapping steel meshes with 20 meshes and having a length of about 90 cm and a width of about 40 cm and the mixture of biochar particles and soil particles (mass ratio of 1:5) filled between the two outside wrapping steel meshes. Titanium wire served as wire is partially embedded into the mixture of biochar particles and soil particles. The distance between the two sheets of outside wrapping steel mesh is about 5 cm. One working electrode and one counter electrode form one electrode couple. The electrode couples are laid perpendicularly to and along the inner bottom at intervals of about 20 cm in order to form a stacked microbial electrochemical reactor. The wires led out of the working electrode and the counter electrode are converged into the DC power supply, as shown in FIG. 1.

2) Carrying out High-Efficiency Degradation of Petroleum Hydrocarbon in the Soil and Remediation of Soil After the assembling, the external water pipe is opened, and the soil is wetted via the water storing and regulating tank. The water outlet switch is closed to stop water from flowing into the water circulating pipe. A voltage of about 0.8 V is provided between the working electrode and the counter electrode after the soil in the reactor housing is completely wetted. The electric signal feedback information is observed in time, and the water outlet switch is opened to circulate the water flow when the maximum current is reached. The flow rate of the circulation water is adjusted to about 10 mL/min. During the degradation remediation process, the external water pipe maintains a small flow rate to compensate for a loss caused by water evaporation.

3) Determining Remediation Effect of the Soil

Figure 3:
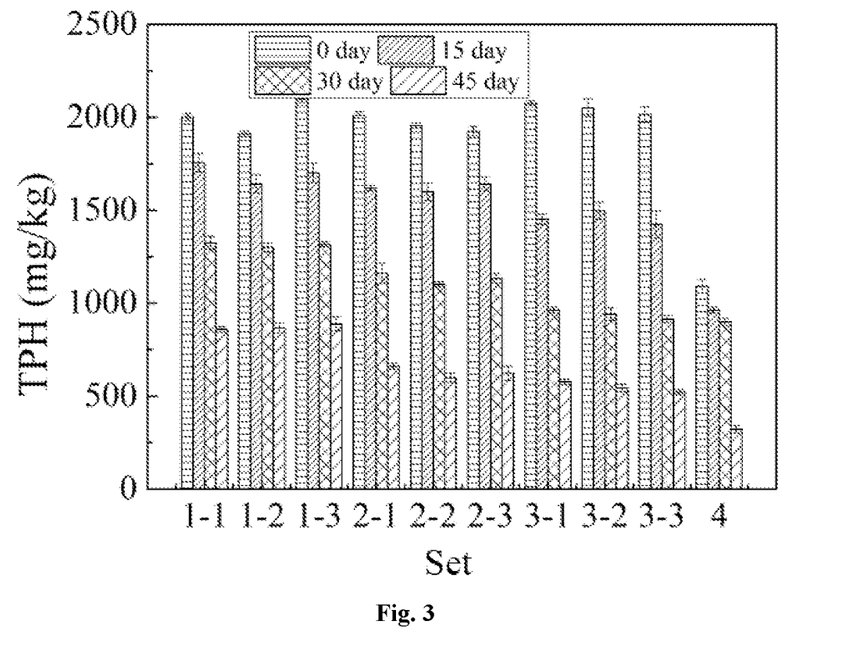
FIG. 3 is a plot of efficiency of soil remediation in embodiment 1.
Figure 4:
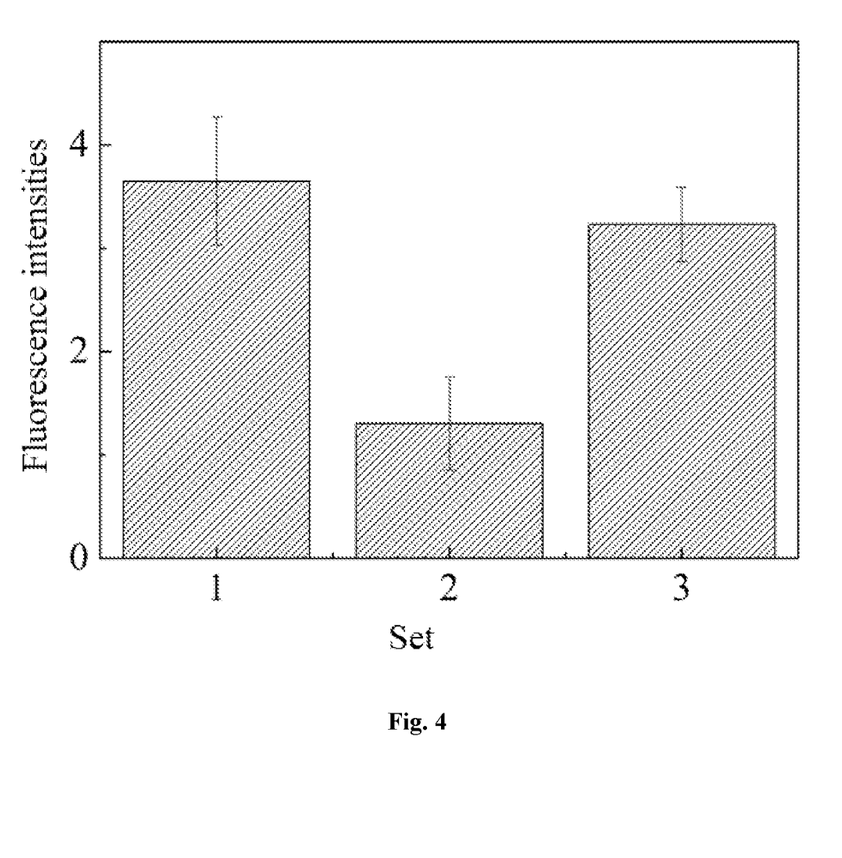
FIG. 4 is a graph representing a difference in fluorescence intensities of petroleum hydrocarbon in contaminated soil before and after operating a stackable circulatable microbial electrochemical reactor of embodiment 1.

The remediation effect of the soil is determined mainly by combining the electrical signal feedback and the fluorescence intensity of the circulation water. When the electrical signal fed back drops to a certain value, it is possible that the drop of the electrical signal caused by an increase in the biomass of the non-electrogenesis microorganisms interferes with the remediation effect for the petroleum hydrocarbon in the soil. The remediation effect of soil needs to be therefore determined by combining the fluorescence intensity of petroleum hydrocarbon in the circulation water, as shown in FIG. 3, where 1-1, 1-2 and 1-3 represent contents of petroleum hydrocarbon at different positions of the surface soil, 2-1, 2-2 and 2-3 represent content of petroleum hydrocarbon at different positions of the middle soil, 3-1, 3-2 and 3-3 represent contents of petroleum hydrocarbon at different positions of the bottom soil, and 4 represents contents of petroleum hydrocarbon in the water circulating pipe. A graph representing a difference in fluorescence intensities of petroleum hydrocarbon in contaminated soil before and after operation of the stackable microbial electrochemical reactor is shown in FIG. 4. It can be seen from FIGS. 3 and 4 that the stacked circulatable microbial electrochemical technology greatly improves the remediation efficiency of petroleum hydrocarbon, which can correspond to the fluorescence intensity in the circulation water.

Comparative Example 1

Similar to Embodiment 1, the comparative example 1 differs from embodiment 1 only in that in the above item 2), the voltage of 0.8V is not applied between the working electrode and the counter electrode.

Figure 5:
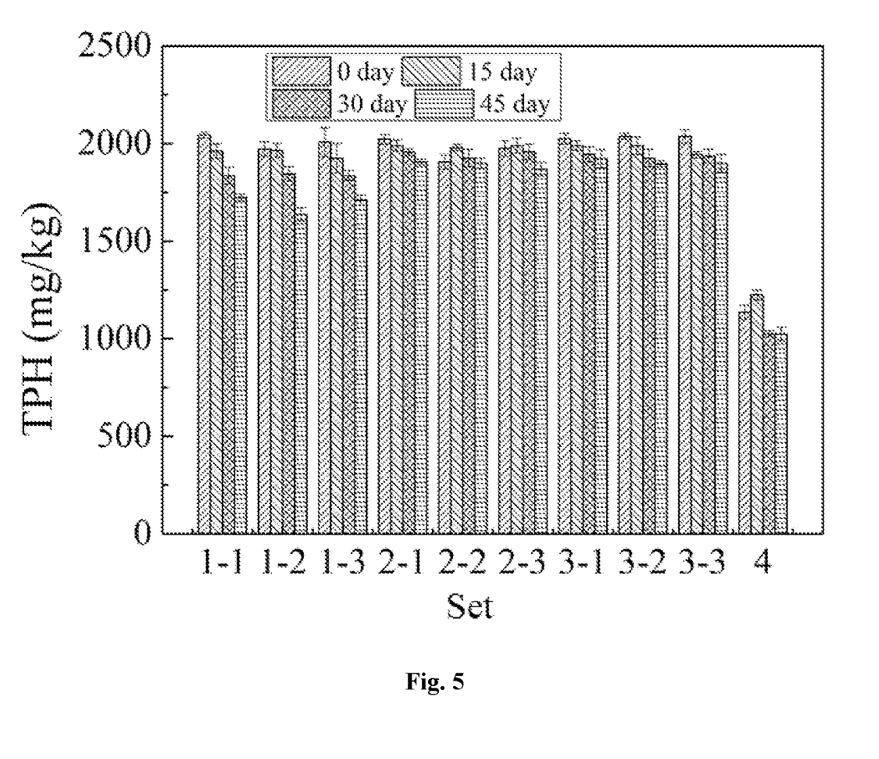
FIG. 5 is a plot of efficiency of soil remediation in comparative example 1.

The remediation effect of the present comparative example is shown in FIG. 5, in which 1-1, 1-2 and 1-3 represent contents of petroleum hydrocarbon at different positions of the surface soil, 2-1, 2-2 and 2-3 represent contents of petroleum hydrocarbon at different positions of the medium soil, 3-1, 3-2 and 3-3 represent contents of petroleum hydrocarbon at different positions of the bottom soil, and 4 represents contents of petroleum hydrocarbon in the water circulating pipe. It can be seen from FIG. 5 that the natural degradation process of microorganism is slow, and the petroleum hydrocarbon concentration in the circulation water is higher than the petroleum hydrocarbon concentration in the circulation water when the reactor is running.

The above description is only preferred embodiments of the present disclosure. It should be pointed out that, for a person of ordinary skill in the art, several improvements and modifications can be made without departing from the principle of the present disclosure. These improvements and modifications should also be regarded as being within the scope of protection of the present disclosure.

What is claimed is:

1. A stacked microbial electrochemical reactor, comprising:
   a reactor body, comprising a reactor housing, and an inner bottom of the reactor housing being in a slope shape;
   a water circulation system, located outside the reactor body;
   an electrode group, being partially inserted into soil and located inside the reactor housing, and the electrode group being laid perpendicularly onto the inner bottom, the electrode group comprising a plurality of electrode couples inserted into the soil which are placed in parallel to each other, wherein a distance between adjacent electrode couples in the plurality of electrode couples is about 15 cm to about 25 cm; and
   a DC power supply, connected with the electrode group via a wire;
   wherein the plurality of electrode couples each comprise a working electrode and a counter electrode arranged in parallel to each other;
   the working electrode comprises two sheets of steel mesh arranged in parallel to each other and a mixture of biochar particles and soil particles filled between the two sheets of steel mesh, a distance between the two sheets of steel mesh is about 4 cm to about 6 cm, wherein the soil particles are farmland soil particles;

the counter electrode is a conductive steel mesh;
a distance between the counter electrode and a steel mesh in the working electrode which is adjacent to the counter electrode is about 4 cm to about 6 cm in each of the plurality of electrode couples;
a water outlet is provided at a bottom of the reactor housing at a first side of the reactor housing;
the water circulation system comprises a water storing and regulating tank located at a top of the reactor housing, at a second side of the reactor housing, the second side of the reactor housing provided with the water storing and regulating tank is opposite to the first side of the reactor housing provided with the water outlet, wherein the water outlet is in communication with the water storing and regulating tank via a water circulating pipe located outside the reactor housing.

2. The stacked microbial electrochemical reactor of claim 1, wherein a slope of the inner bottom of the reactor housing is about 30 degrees with respect to a horizontal plane.

3. The stacked microbial electrochemical reactor of claim 1, wherein the two sheets of steel mesh and the conductive steel mesh each have an aperture of 10-20 meshes.

4. The stacked microbial electrochemical reactor of claim 1, wherein the biochar particles and soil particles in the mixture of biochar particles and soil particles have mass ratio of 1:1-1:5.

5. The stackable microbial electrochemical reactor of claim 1, wherein the water circulating pipe is provided with a water outlet switch and a speed-regulating water circulating pump.

6. The stacked microbial electrochemical reactor of claim 1, wherein the water circulation system further comprises an external water pipe in communication with a water inlet of the water storing and regulating tank.

7. A degradation method of petroleum hydrocarbon contaminated soil using the stacked circulatable microbial electrochemical reactor of claim 5, comprising:
filling the petroleum hydrocarbon contaminated soil to be degraded between the working electrode and the counter electrode of the stacked circulatable microbial electrochemical reactor;
closing the water outlet switch, wetting the petroleum hydrocarbon contaminated soil in the stacked circulatable microbial electrochemical reactor with water in the water storing and regulating tank, and turning on the wireless-internet-supplying-power collector to provide a voltage between the working electrode and the counter electrode after the petroleum hydrocarbon contamination soil is completely wetted;
opening water outlet switch when an electrical signal reaches a maximum current activating the speed-regulating water circulating pump such that water circulates through the water circulating pipe and the reactor housing for performing degradation.

8. The degradation method of claim 7, wherein the voltage is about 0.7 V to about 0.8 V.

9. The degradation method of claim 7, wherein the water circulating through the water circulating pipe has a flow rate of about 1 mL/min to about 10 mL/min during the degradation.

* * * * *